United States Patent [19]

Wong

[11] Patent Number: 4,826,932

[45] Date of Patent: May 2, 1989

[54] DIOXOLANE CONTAINING POLYMER

[75] Inventor: Pui K. Wong, Amsterdam, Netherlands

[73] Assignee: Shell Oil Company, Houston, Tex.

[21] Appl. No.: 138,779

[22] Filed: Dec. 29, 1987

[51] Int. Cl.$^4$ .............................................. C08G 67/02
[52] U.S. Cl. ..................................... 525/539; 525/61; 525/328.8; 525/383; 526/72; 528/392
[58] Field of Search ...................... 525/539, 61, 328.8, 525/383; 528/392; 526/72

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,979,367 | 9/1976 | Kiovsky et al. | 260/79.5 |
| 3,979,373 | 9/1976 | Kiovsky et al. | 526/12 |

FOREIGN PATENT DOCUMENTS

| | | |
|---|---|---|
| 0121965 | 10/1984 | European Pat. Off. . |
| 0181014 | 5/1986 | European Pat. Off. . |
| 0222454 | 5/1987 | European Pat. Off. . |
| 1081304 | 3/1965 | United Kingdom . |

*Primary Examiner*—Harold D. Anderson

[57] ABSTRACT

Reaction of a linear alternating copolymer of carbon monoxide and ethylene with a 1,2-dihydroxyalkane of up to 1 additional hydroxyl group produce polydioxolanes having dioxolane moieties attached to the polymer chain through a common carbon atom and furan moieties within the polymer chain.

4 Claims, No Drawings

DIOXOLANE CONTAINING POLYMER

FIELD OF THE INVENTION

This invention relates to certain polymeric dioxolane derivatives having a plurality of dioxolane moieties attached to the polymer chain. More particularly it relates to a novel class of polymers which incorporate furan moieties within the polymer chain and dioxolane moieties sharing a carbon atom common to the polymer chain, which polymers are produced by reaction of polyhydric alcohols with a linear alternating copolymer of carbon monoxide and ethylene.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical catalysts, e.g., peroxy compounds. Nozaki produced linear alternating copolymers of carbon monoxide and ethylene, inter alia, in the presence of arylphosphine complexed of palladium as catalyst employed with certain inert solvents. See, for example, U.S. Pat. No. 3,694,412.

More recently, the class of linear alternating polymers of carbon monoxide and at least one ethylenically unsaturated hydrocarbon, e.g., ethylene, has become of greater interest because of the greater availability of the polymers. The more recent general process for the production of such polymers is illustrated by the published European patent application Nos. 0,121,965 and 0,181,014 and by copending U.S. patent application Ser. No. 930,468, filed Nov. 14, 1986. The process generally involves a catalyst composition formed from a compound of the Group VIII metals palladium, cobalt or nickel, the anion of a non-hydrohalogenic acid having a pKa below about 6, preferably below about 2, and a bidentate ligand of phosphorus, arsenic or antimony.

The class of linear alternating polymers of carbon monoxide and at least one ethylenically unsaturated hydrocarbon, also known as polyketones or polyketone polymers, is now conventional. The polyketone polymers are known to be premium thermoplastics having utility in a variety of applications. However, because of the presence within the polymer of carbonyl functional groups, it is possible to chemically modify the polymer by reaction at or through the carbonyl groups to produce modified polymers of modified properties. For example, reduction of the carbonyl groups leads to the production of polymeric polyols and reductive amination leads to the presence of amino groups attached to the polymer chain.

It is also possible to introduce cyclic structures into or onto the polymer chain. Kovsky et al., U.S. Pat. No. 3,979,373, introduced furan linkages into the polymer chain by acid-catalyzed dehydration of a carbon monoxide/ethylene copolymer. A second Kiovsky et al. patent, U.S. Pat. No. 3,979,367, produced cyclic thioketal groups by reaction of the copolymer and dithiol compounds. In both cases, however, the degree of formation of cyclic structures was low, generally less than about 25%. While the presence of cyclic structures in the Kiovsky et al polymers served to modify the properties of the carbon monoxide/ethylene copolymers, it would be of advantage to provide for further modification through the procession of more extensive cyclic structures, thereby providing utilities beyond those available from the polyketone.

SUMMARY OF THE INVENTION

The invention relates to a class of novel polydioxolane polymers incorporating furan moieties within the polymer chain and dioxolane moieties attached to the polymer chain through a common carbon atom. More particularly, the invention relates to a novel class of such polymers produced by acid-catalyzed reaction of a linear alternating copolymer of carbon monoxide and ethylene with polyhydric alcohols.

DESCRIPTION OF THE INVENTION

The polymer precursor of the polydioxolane polymers of the invention is a linear alternating copolymer of carbon monoxide and ethylene represented by the repeating formula

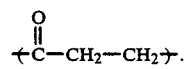

The end groups or "caps" of the polymer depend on what materials are present during the production of the polymer and how and whether the polymer has been purified. However, the precise nature of the end groups is of little significance so far as the overall properties of the polymer are concerned so that the polymer is fairly represented by the polymer chain as depicted above.

Of particular interest are polymers of the above structure having a molecular weight of from about 1,000 to about 200,000 but more particularly having a molecular weight of from about 10,000 to about 50,000. The physical properties of the copolymers will vary somewhat as does the molecular weight but the polymers are crystalline and are characterized by a melting point on the order of 260° C.

The polymers are produced by contacting the carbon monoxide and ethylene in the presence of a suitable catalyst composition. Although the scope of the polymerization is extensive, see, for example, the above published European patent applications, for purposes of illustration a preferred catalyst composition is formed from palladium acetate, the anion of trifluoroacetic acid or p-toluenesulfonic acid and a bidentate ligand selected from 1,3-bis(diphenylphosphino)propane and 1,3-bis[-di(2-methoxyphenyl)phosphino]propane. Reaction is preferably conducted under polymerization conditions of elevated temperature and pressure and in the liquid phase in the presence of an inert diluent such as methanol or ethanol. The copolymer is typically insoluble in the media of its production and is recovered as by filtration or decantation.

The polyhydric alcohol precursor of the polydioxolane polymers of the invention is a 1,2-dihydroxyalkane of up to 6 carbon atoms and up to 1 additional hydroxyl group. Such polyhydric alcohols are represented by the formula

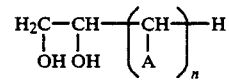

wherein A represents hydrogen or hydroxyl, n is an integer from 0 to 4 inclusive and the molecule contains no more than a single A-hydroxyl group. Illustrative of the polyhydric alcohols are ethylene glycol, glycerol, 1,2,6-hexanetriol, 1,2,4-hexanetriol, 1,2,5-pentanetriol and 1,2-pentanediol. Ethylene glycol and glycerine form a preferred class of polyhydric alcohols and particularly preferred is ethylene glycol. Mixtures of such polyhydric alcohols are also suitably employed.

The polyketone polymer and the polyhydric alcohol are contacted in the presence of an aprotic liquid reaction diluent. The polyhydric alcohol is generally employed in a molar excess. Although the molar character of a polymer is often difficult to determine, it would seen that 1 mole of polyhydric alcohol would react with 1 mole of carbonyl group to form the dioxolane structure. Thus, molar ratios of polyhydric alcohol to carbonyl group present in the polymer of from about 1:1 to about 20:1 are typically employed in the reaction mixture with molar ratios of from about 2:1 to about 5:1 being preferred.

Suitable aproitc reaction diluents are those in which the polyhydric alcohol is soluble and which do not contain hydroxyl groups. Illustrative aprotic reaction diluents are hydrocarbon diluents including aliphatic hydrocarbons such as hexane and isooctane, aromatic hydrocarbons including benzene, toluene, xylene and ethylbenzene; chlorinated aromatic hydrocarbon diluents such as chlorobenzene; and ethers including dimethyl ether, diethyl ether and methyl isopropyl ether. Hydrocarbon diluents are generally preferred over oxygenated diluents. Tolune and chlorobenzene are preferred reaction diluents and especially useful is toluene. Mixutes of two or more of the above diluents are satisfactory, for example a mixture of toluene and chlorobenzene.

Reaction of the polyketone polymer and the polyhydric alcohol is conducted under conditions of elevated temperature and sufficient pressure to maintain the reaction mixture in a non-gaseous phase. Reaction is suitably conducted in an autoclave or other pressure vessel at elevated temperature and pressure but is most easily effected under reflux at the boiling temperature of the reaction mixture. Reaction is typically catalyzed by the presence within the reaction mixture of a trace quantity of a strong acid which is suitably an inorganic acid such as sulfuric acid, phosphoric acid or perchloric acid or is an organic acid such as trifluoroacetic acid, methanesulfonic acid or p-toluenesfonic acid. The polydioxolane product is often obtained as an insoluble polymer which is separated from any unreacted copolymer and any gel that might be formed by selective extraction with a solvent in which the polydioxolane is soluble but the undesirable materials are insoluble, e.g., a solvent such as toluene, chlorobenzene or chloroform. In modifications where the polydioxolane product is soluble in the reaction diluent, recover is effected by solvent removal as by evaporation followed by a selective extraction of the desired polydioxolane.

The polydioxolane polymers of the present invention are illustratively formed by condensation of the 1,2-vic hydroxy groups of the polyhydric alcohol with a carbonyl group of the polyketone polymer thereby forming a dioxolane moiety which shares a carbon atom, the carbon of the carbonyl group, with the polymer chain. In addition, because of the acidic character of the reaction, a certain percentage of the carbonyl groups will undergo acid-catalyzed dehydration with an adjacent carbonyl group to form a furan moiety. It is also possible that a small percentage of the carbonyl groups will remain unreacted and in the form of the original polyketone polymer. The polydioxolane polymer product is therefore represented by the formula

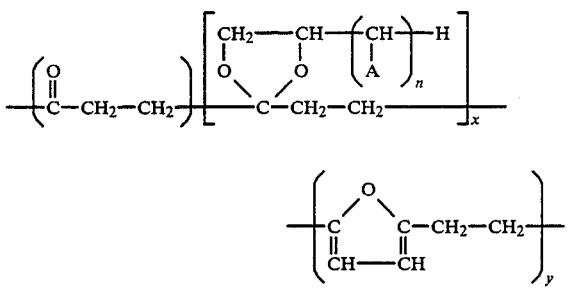

wherein A and n have the previously stated significance, the

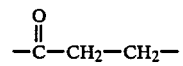

units are less than 5%, preferably less than 2%, of the units of the polymer and the ratio of x:y is at least 2 and preferably at least 8.

By way of further illustration, acid catalyzed reaction of ethylene glycol with the carbon monoxide/ethylene copolymer results in the production of a product having units of the formulas

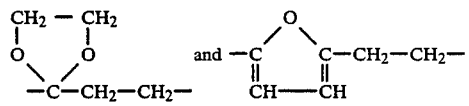

in addition to any

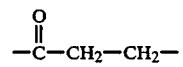

units resulting from absence of carbonyl group reaction. In similar fashion, reaction of a mixture of ethylene glycol and glycerol results in two types of dioxolane units of the above formula and a product in which in a first number of dioxolane units the term n=0 and in a second number of units n=1 and A is hydroxyl. The ratio of the first number of units to the second number of units will be in about the proportion that the ethylene glycol and glycerol are present in the reaction mixture.

The polydioxolanes of the invention are structurally related to the poly(vinyl acetals), produced from poly(vinyl alcohol) and aldehydes which are commercial materials of established utility. The polydioxolanes share the applications of serving as adhesives for metal and for glass including the production of glass laminates such as safety automobile glass. The polydioxolanes can be processed by the usual techniques such as extruding, molding, casting and coating.

The invention is further illustrated by the following Illustrative Embodiments which should not be construed as limiting.

ILLUSTRATIVE EMBODIMENT I

A copolymer of carbon monoxide and ethylene was produced by a procedure similar to that of published European patent application No. 0,081,014 in the presence of a catalyst composition formed from palladium acetate, the anion of trifluoroacetic acid and 1,3-bis(diphenylphosphino)propane. The copolymer had a melting point 257° C. and a Limiting Viscosity Number (LVN) of 1.1, measured in m-cresol at 100° C.

ILLUSTRATIVE EMBODIMENT II

The copolymer of Illustrative Embodiment I (5 g) was treated with a molar excess of ethylen glycol (12 g) and a trace of p-toluenesulfonic acid in refluxing toluene overnight. The resulting reaction produce was fractionated with toluene into a first portion, about 33% by weight, which was gel and a second portion which was a toluene soluble polymer. The toluene soluble fraction was recovered by evaporation of the toluene. The polymer was partially crystalline with a melting point of 153° C. and a heat of melting of 9.7 cal/g. NMR analysis of the polymer showed that 96% of the carbonyl groups were converted to 1,3-dioxolane structures and the remaining carbonyl groups dehydrated to form furan ring systems. This polymer is therefor represented by the formula

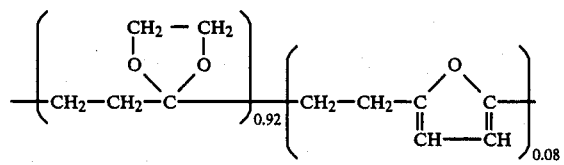

ILLUSTRATIVE EMBODIMENT III

The procedure of Illustrative Embodiment II was repeated except that a 95:5 mixture (by weight) of ethylene glycol and glycerol was employed in place of the ethylene glycol. The resulting reaction product was completely insoluble in toluene but dissolved slowly in chloroform, chlorobenzene and hexaflurorisopropanol. The NMR of the polymer showed a random distribution in the polymer of

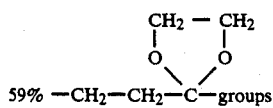

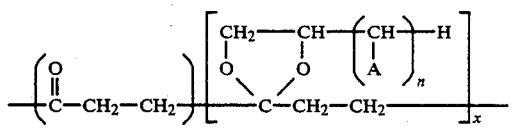

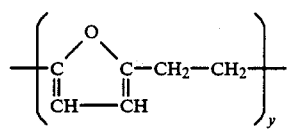

the latter apparently representing unreacted carbonyl groups.

What is claimed is:

1. The polydioxolane having recurring units of the formula

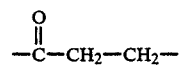

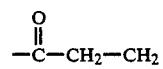

wherein A is hydrogen or hydroxyl, n is an integer from 0 to 4 inclusive with the proviso that no more than one A can be hydroxyl, the $$-\overset{O}{\underset{\|}{C}}-CH_2-CH_2-$$

units are less than 5% of the units of the polymer and the ratio of x:y is at least 2.

2. The polydioxolane of claim 1 wherein the units $$-\overset{O}{\underset{\|}{C}}-CH_2-CH_2$$

are less than 2% of the units of the polymer and n is zero.

3. The polydioxolane of claim 2 wherein the ratio of x:y is at least 8.

4. The polydioxolane of claim 1 wherein, in a number of dioxolane units n is zero and in a number of dioxolane units A is hydroxyl and n is one.

* * * * *